United States Patent

Campbell et al.

[11] Patent Number: 5,854,452
[45] Date of Patent: Dec. 29, 1998

[54] SYSTEM FOR FASTENING SHEET MATERIALS TOGETHER

[75] Inventors: Michael T. Campbell, Grand Rapids; Andrew R. Skestone, Hastings, both of Mich.

[73] Assignee: Cascade Engineering, Inc., Grand Rapids, Mich.

[21] Appl. No.: 901,233

[22] Filed: Jul. 25, 1997

Related U.S. Application Data

[60] Provisional application No. 60/022,695 Jul. 26, 1996.
[51] Int. Cl.⁶ ...................................................... E04B 1/82
[52] U.S. Cl. ........................................... 181/290; 181/286
[58] Field of Search ................................... 181/210, 286, 181/290, 292, 293, 295

[56] References Cited

U.S. PATENT DOCUMENTS

| | | |
|---|---|---|
| 3,494,244 | 2/1970 | Wayland . |
| 4,568,215 | 2/1986 | Nelson . |
| 4,705,139 | 11/1987 | Gahlau et al. .......................... 181/290 |
| 4,707,894 | 11/1987 | Friedwald . |
| 4,782,913 | 11/1988 | Hoffmann et al. ...................... 181/286 |
| 4,800,984 | 1/1989 | Kerman . |
| 4,861,208 | 8/1989 | Boundy . |
| 4,867,271 | 9/1989 | Tschudin-Mahrer .................... 181/290 |
| 4,938,645 | 7/1990 | Wollar . |
| 5,056,199 | 10/1991 | Stein et al. . |
| 5,483,028 | 1/1996 | Holwerda . |
| 5,507,610 | 4/1996 | Benedetti et al. . |

FOREIGN PATENT DOCUMENTS

| | | |
|---|---|---|
| 59-164238 | 9/1984 | Japan . |
| 2 216 081 | 4/1989 | United Kingdom . |

OTHER PUBLICATIONS

Patent abstracts of Japan, vol. 013, #335 (M–856), Jul. 27, 1989.

*Primary Examiner*—Khanh Dang
*Attorney, Agent, or Firm*—Rader, Fishman, Grauer & McGarry

[57] ABSTRACT

A barrier wall (24) separating a passenger compartment from an engine compartment of a motor vehicle has an acoustical barrier assembly (102) mounted thereto. The acoustical barrier assembly (102) includes first and second mat portions (104, 106) juxtaposed to each other in overlapping relationship. Each mat portion (104, 106) is preferably of a molded construction and has sound dampening characteristics. The first and second mat portions (104, 106) each have a terminal edge (130, 122). The terminal edge (130) of the second mat portion is in engagement with one of the surfaces of the first mat portion to thereby acoustically seal the first and second mat portions together. Spacer ribs (124, 132) are integrally with the first and second mat portions (104, 106). Each ribs (124, 132) extends from its corresponding mat portion to the other mat portion. The spacer ribs (124, 132) are preferably adjacent to but spaced from the terminal edges (122, 130) of their respective mat portions to space the mat portions from each other.

13 Claims, 4 Drawing Sheets

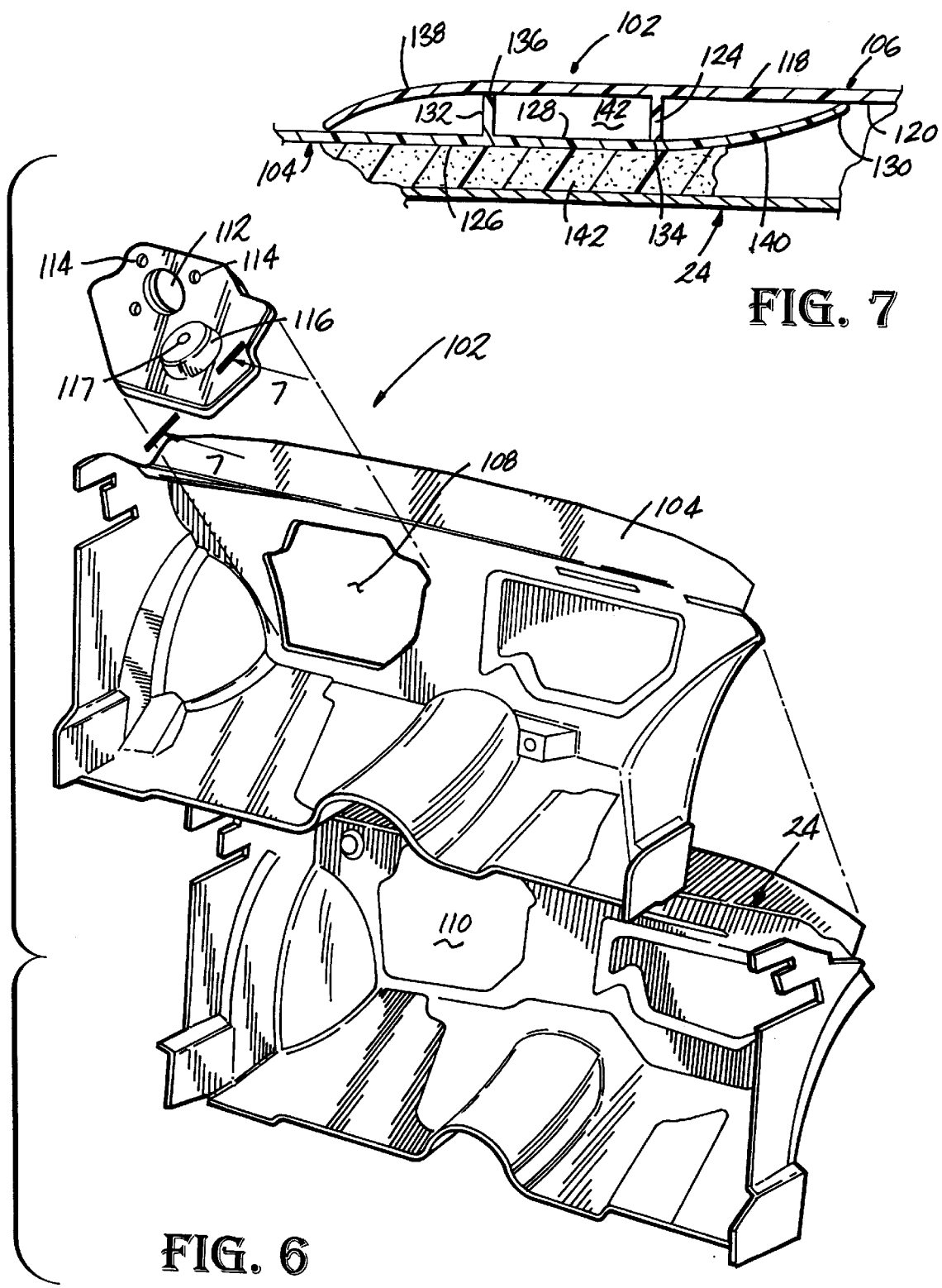

SYSTEM FOR FASTENING SHEET MATERIALS TOGETHER

CROSS-REFERENCE TO RELATED APPLICATION

This application claims the benefit of U.S. Provisional Application No. 60/022,695 filed on Jul. 26, 1996.

BACKGROUND OF THE INVENTION

1. Field of the Invention

This invention relates to a system for fastening sheet materials together, and more particularly to a system for fastening together and acoustically sealing two vehicle dash mat components.

2. Description of the Related Art

In most contemporary automobiles, a steel firewall separates the engine compartment from the passenger compartment. To reduce the transmission of sound from the engine compartment through the fire wall and into the passenger compartment, a sound barrier mat (otherwise known as a dash mat) is typically molded as a single piece of an elastomeric material. The dash mat is mounted to and substantially overlies the fire wall such that an outer surface of the mat is in contact with a bottom surface of the vehicle carpet and extends beyond the carpet to an upper portion of the firewall behind the instrument panel. During installation in certain full size vehicles, it is often difficult to manipulate the large, flexible dash mat into proper position in the vehicle. The assembler must fasten the dash mat to the vehicle in a limited amount of time before moving on to the next vehicle, which may be difficult with a large, complex one-piece dash mat.

Furthermore, openings are formed in the dash mat and are aligned with openings in the fire wall for the passage of cable guides, wiring harnesses, steering columns, accessory mounts, and so on. Since the dash mat is designed to insulate the passenger compartment from engine compartment noise, it is desirable to size the openings as small as possible to fit snugly around the various elements projecting through the openings without compromising the ease and efficiency of installing such elements. One difficult area is the opening formed in the dash mat for receiving the steering column, which is typically quite large when compared with other openings in the dash mat. Maintaining the noise reduction qualities of the mat in this area is difficult due to the size of the opening.

SUMMARY OF THE INVENTION

These and other problems of the prior art are overcome by the provision of a multi-part dash mat formed of a plurality of mats or panels and a system for mechanically fastening the mats or panels together so that they are acoustically sealed.

According to one embodiment of the invention, an acoustical barrier adapted to be mounted to a barrier wall includes first and second mat portions juxtaposed to each other in overlapping relationship. Each mat portion is preferably of a molded construction and has sound dampening characteristics. The first and second mat portions each have a terminal edge. The terminal edge of the second mat portion is in engagement with the outer surface of the first mat portion to thereby acoustically seal the first and second mat portions together. A first spacer rib is integrally molded at one end thereof as a single piece with one of the first and second mat portions. The rib either extends from the one mat portion to the other mat portion or from the one mat portion to the barrier wall when the acoustical barrier is mounted thereto. The first spacer rib is preferably adjacent to but spaced from the terminal edge of the one mat portion to space the one mat portion from the other mat portion or to space the one mat portion from the barrier wall.

According to a further embodiment of the invention, an acoustical barrier adapted to be mounted to a barrier wall includes first and second mat portions mounted to each other in overlapping relationship. As in the previous embodiment, each mat portion is of a molded construction and has sound dampening characteristics. The first and second mat portions each have a terminal edge and an integrally molded channel extending adjacent the terminal edge. The channel of the second mat portion is received within the channel of the first mat portion to thereby mutually align the first and second mat portions when mounting the mat portions together.

According to an even further embodiment of the invention, a motor vehicle acoustical barrier assembly has a barrier wall separating a passenger compartment from an engine compartment and an acoustical barrier mounted to the barrier wall. The acoustical barrier includes first and second mat portions juxtaposed to each other in overlapping relationship. Each mat portion is preferably of a molded construction and has sound dampening characteristics. The first and second mat portions each have a terminal edge. The terminal edge of the second mat portion is in engagement with the outer surface of the first mat portion to thereby acoustically seal the first and second mat portions together. A first spacer rib is integrally molded at one end thereof as a single piece with one of the first and second mat portions. The rib either extends from the one mat portion to the other mat portion or from the one mat portion to the barrier wall when the acoustical barrier is mounted thereto. The first spacer rib is preferably adjacent to but spaced from the terminal edge of the one mat portion to space the one mat portion from the other mat portion or to space the one mat portion from the barrier wall. At least one fastener can be pre-installed in one of the panels at a lower portion of the channel and extends upwardly for clear view by the installer. The other panel is then pressed over the fastener until the two panels are secured together.

BRIEF DESCRIPTION OF THE DRAWINGS

The invention will now be described with reference to the drawings in which:

FIG. 6 is an exploded, top, perspective view of a multi-part dash mat assembly according to a third embodiment of the invention for attachment to the fire wall of a vehicle; and FIG. 7 is a cross-sectional assembled view of the multi-part dash mat assembly taken along line 7—7 of FIG. 6.

DETAILED DESCRIPTION OF THE PREFERRED EMBODIMENTS

Figure 1:
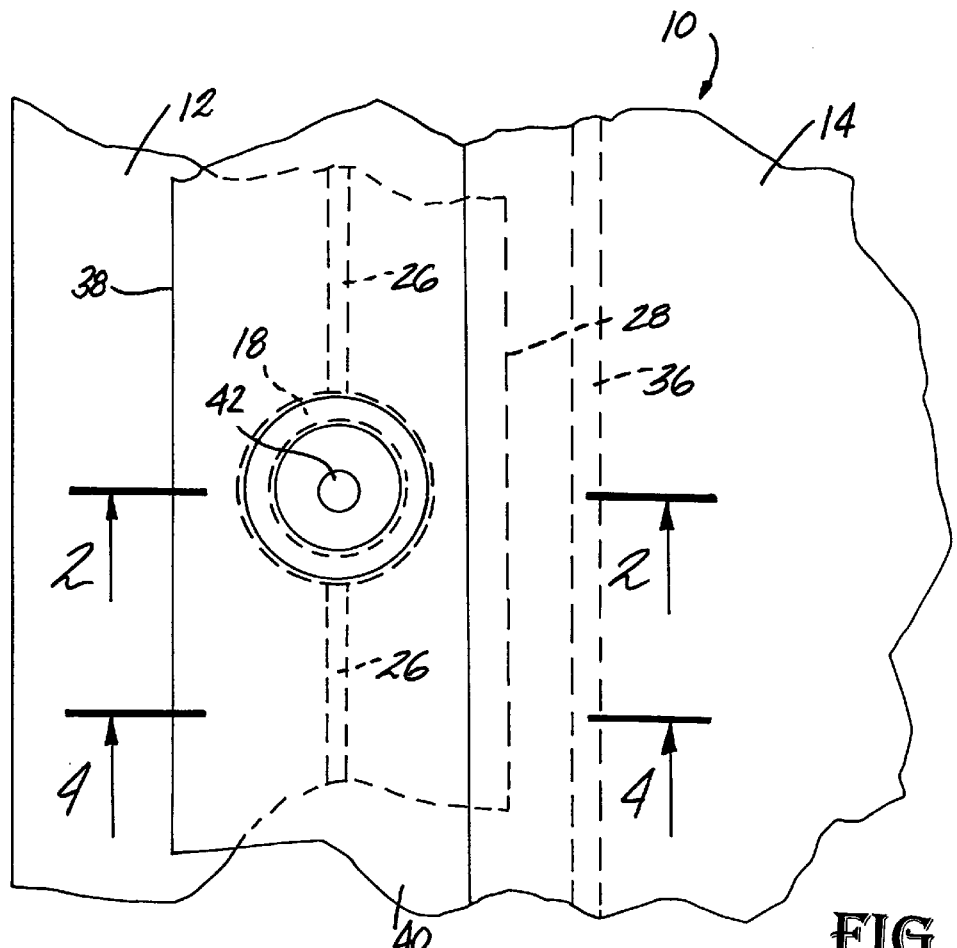
FIG. 1 is a top, plan view of a portion of a multi-part dash mat assembly having first and second mats positioned for being mechanically fastened together according to the invention.

Referring now to FIGS. 1–4, a multi-part dash mat assembly 10 includes a first mat 12 and a second mat 14 connected together with a fastener 16. The mats 12, 14 are preferably formed of a filled elastomeric moldable polymer, e.g., elastomeric polypropylene, and serve as sound barrier layers to reduce the transmission of sound from the engine compartment through the fire wall and into the passenger compartment of a vehicle. The mat 12 includes an outer surface 17 and an inner surface 20. A cylindrical spacer rib 18 is integrally formed with and extends from the inner surface 20 of the first mat 12. An inner edge 22 of the rib 18 is adapted to abut a firewall 24 when the mat 12 is in the installed position. A fastener receptacle 19 in the form of an inverse cone is integral with the mat 12 and extends into the interior space 21 of the cylindrical spacer rib 18. An aperture 23 extends through the receptacle 19 for receiving the fastener 16. An elongate spacer rib 26 is formed integrally with and extends from the inner surface 20. The elongate rib 26 preferably extends parallel to and in proximity with an terminal edge 28 of the mat 12. As illustrated in FIG. 1, two elongate ribs 26 (shown in hidden line) extend from opposite sides of the cylindrical rib 18 (also shown in hidden line) and are formed integrally therewith to lend structural support to the cylindrical rib 18 and the first mat 12. Preferably, the inner surface 20 of the mat 12 is provided with a plurality of cylindrical ribs 18 in spaced relation thereon and an elongate rib 26 extending between adjacent cylindrical ribs 18. An inner edge 30 of each elongate rib 26 is adapted to abut the firewall 24 when the mat 12 is in the installed position.

The second mat 14 includes an outer surface 32 and an inner surface 34. An elongate spacer rib 36 is formed integrally with and extends from the inner surface 34 of the mat 14. The elongate rib 36 preferably extends parallel to and in proximity with an terminal edge 38 of the mat 14. An end surface 39 of the elongate rib 36 is adapted to abut the firewall 24 when the mat 14 is in the installed position. An angled section 40 extends between the terminal edge 38 and the elongate spacer rib 36. An opening 42 extends through the mat 14 and is positioned approximately mid-way between the terminal edge 38 and the angled section 40. In the installed position, the terminal edge 28 of the mat 12 is in contact with an inner surface of the angled section 40 and the opening 42 is in alignment with the aperture 23 in mat 12. The attaching flange 40 in mat 14 provides a wide dimensional tolerance range in the location of aperture 23 and opening 42, the location and height of the spacer ribs 18, 26, 36, and the thickness of the mats 12, 14.

Figure 2:
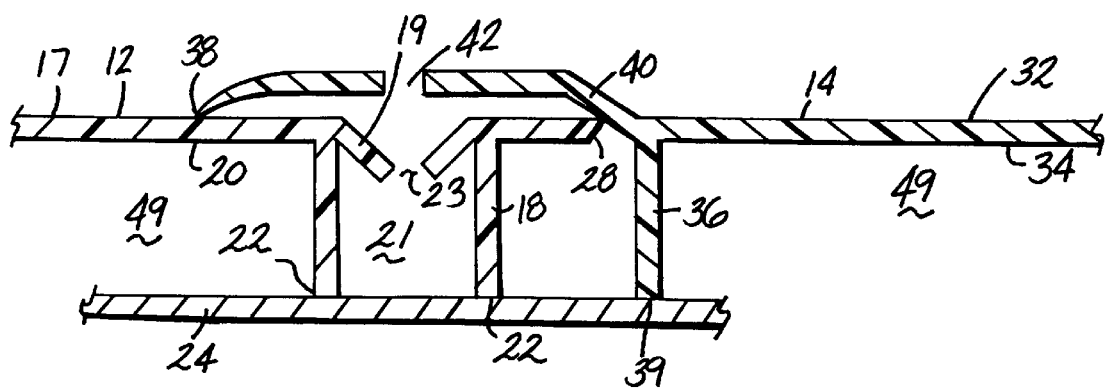
FIG. 2 is a cross-sectional view of the multi-part dash mat assembly shown in FIG. 1 and taken along line 2—2 of FIG. 1.
Figure 3:
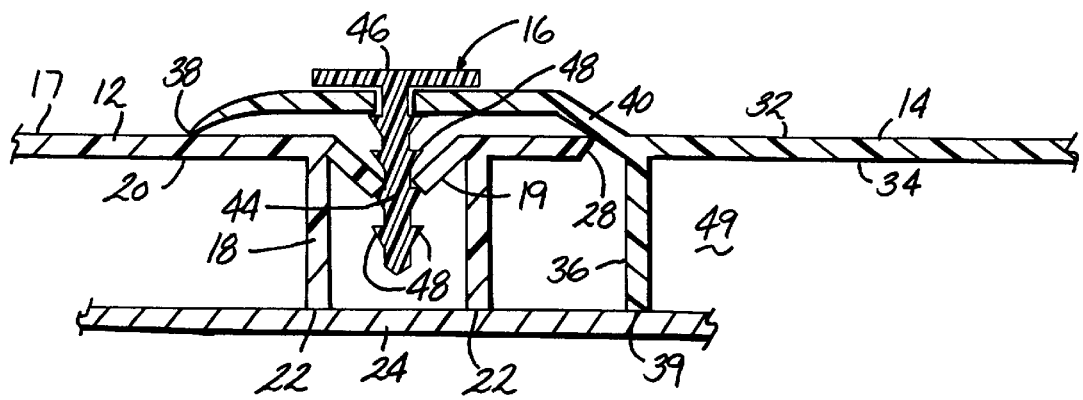
FIG. 3 is a cross-sectional view similar to FIG. 2 and illustrating an installed fastener for securing the dash mat parts together.
Figure 4:
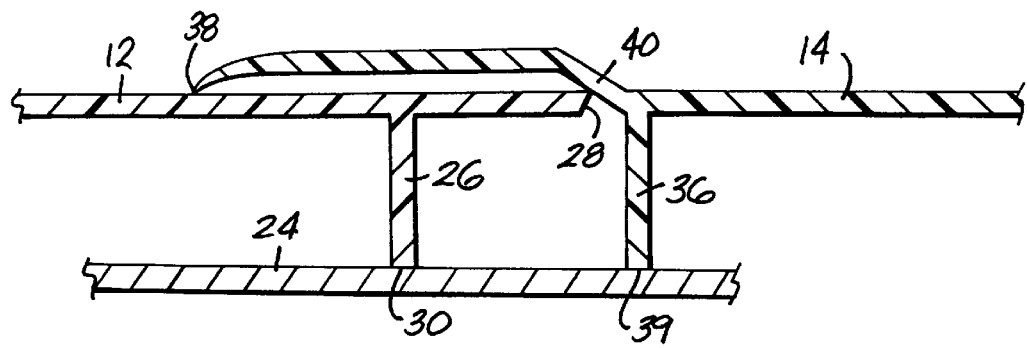
FIG. 4 is a cross-sectional view of the multi-part dash mat of FIG. 1 and taken along line 4—4 of FIG. 1.

As illustrated in FIG. 2, the mechanical fastener 16 has an elongate central pin 44 integrally attached to and depending from a circular flange head 46. A plurality of circumferentially extending teeth 48 are axially spaced along the central pin 44. The terminal edges of teeth 48 are pointed upwardly, as viewed in FIG. 2, and flex further upwardly when the pin 44 is pushed through the apertures 42 and 23.

To connect the mats 12 and 14 together, the fastener 16 is first installed on the mat 14 by completely inserting the pin 44 into the aperture 42 until the tooth 48 closest to the flange head 46 abuts the inner surface 20 to lock the fastener to the mat 14. This step is repeated until all of the fasteners are installed in their corresponding apertures in the mat 14. This step can be performed at a location remote from the vehicle assembly site, such as at the mat molding facility. The mat 12 is then fixed in position adjacent to the firewall 24 using conventional fastening techniques. The mat 14 is subsequently positioned in place adjacent to the firewall such that the edge 38 overlaps a portion of the mat 12 and the pin 44 of each fastener 16 is in alignment with the aperture 23 of the mat 12. The pin of each fastener is then pushed into a corresponding respective aperture 23 to secure the mats together. A section of the mat 14 between the edge 38 and the attaching flange 40 is curved slightly inward to impart an outward biasing force against the fastener 16. This feature serves to further lock the fastener to the mat 12.

In the installed position, the inner surfaces 20, 34 of the mats 12, 14, respectively, face the vehicle firewall 24, while the outer surfaces 17, 32 face the underside of a vehicle carpet (not shown) and extend past the carpet behind the instrument panel. A space 49 is formed by the spacer ribs 18, 26, and 36 that can be filled with a well known foam absorber layer. Other spacer ribs (not shown) can be formed at different locations on the mats 12, 14 in order to maintain the integrity of the inner space 49. The edges 28 and 38 serve to seal the inner space 49 from the outside environment. Thus, although the dash mat is formed in two parts, there is a good acoustical seal at the joint between the mats 12 and 14.

Figure 5:
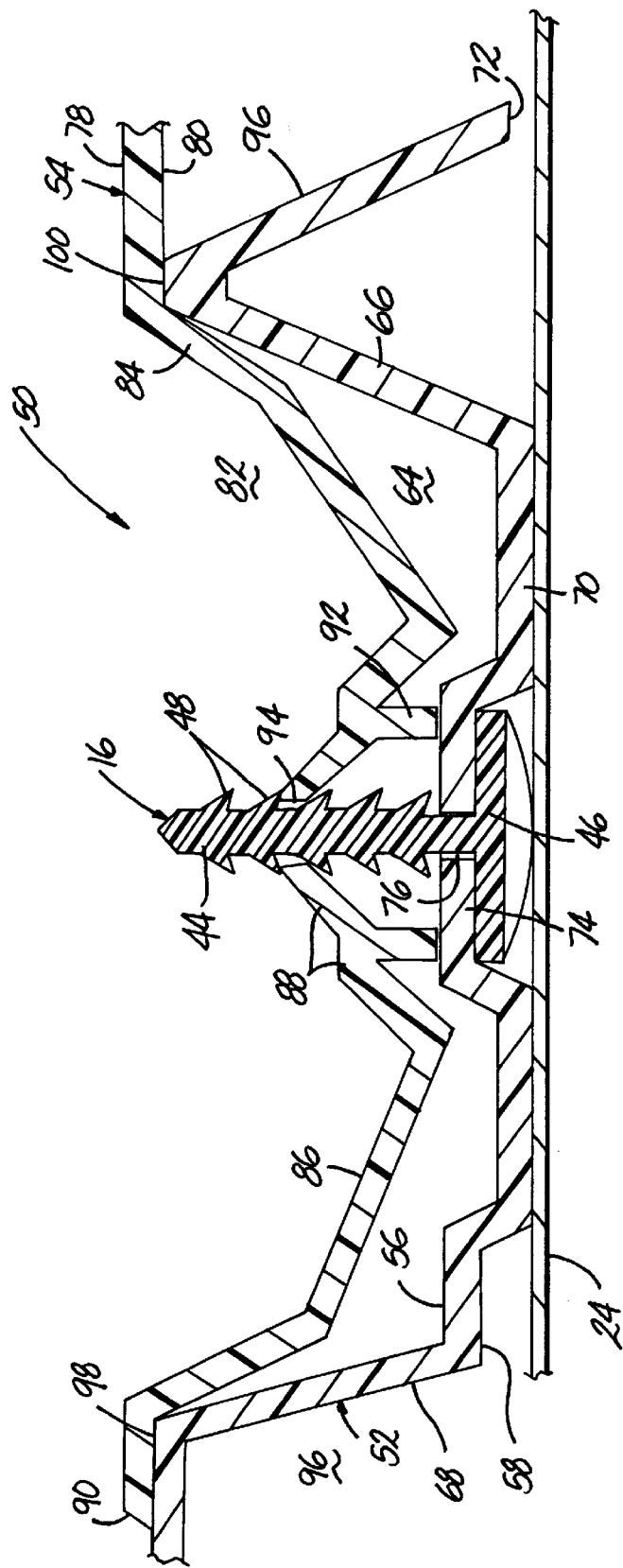
FIG. 5 is a cross-sectional view of a multi-part dash mat assembly according to a second embodiment of the invention.

A second embodiment of a multi-part dash mat assembly 50 is illustrated in FIG. 5, wherein like parts in the previous embodiment are represented by like numerals. The multi-part dash mat assembly 50 includes a first mat 52 and a second mat 54 connected together with a fastener 16. As in the previous embodiment, the mats 52, 54 are preferably formed of a filled elastomeric moldable polymer, e.g., elastomeric polypropylene.

The first mat 52 includes an outer surface 56 and an inner surface 58 that is adapted to face the firewall 24 when installed. A channel 64 is defined in the mat 52 by a pair of inclined spacer ribs 66, 68 that extend outwardly from opposite sides of a base portion 70. The channel 64 preferably extends parallel to and in proximity with an terminal edge 72 of the mat 52. A boss 74 having an inversely frusto-conical shape is formed with the base portion 70 and extends outwardly therefrom. An inner surface of the boss 74 is dimensioned to receive the circular flange 46 of a fastener 16. An aperture 76 is centrally located in the boss and is sized to receive the pin 44 of the fastener.

The second mat 54 includes an outer surface 78 and an inner surface 80 that is adapted to face the firewall 24 when installed. A channel 82 is defined in the mat 54 by a pair of inclined spacer ribs 84, 86 that extend outwardly from opposite sides of an inversely conical base portion 88. The channel 82 preferably extends parallel to and in proximity with an terminal edge 90 of the mat 54. A cylindrical support rib 92 extends from the inner surface 80 of the mat 54 below the base portion 88. The support rib 92 is adapted to contact an outer surface of the boss 74 in the installed position. An aperture 94 is centrally located in the conical base portion 88 and is sized to receive the pin 44 of the fastener 16.

The mat 52 is preferably formed with a plurality of bosses 74 in spaced relation along the channel 64 and the mat 54 is preferably formed with a corresponding number of base portions 88 along the channel 82 to receive a plurality of fasteners 16.

To connect the mats 52 and 54 together, a fastener 16 is first installed on the mat 52 by completely inserting the pin 44 into the aperture 76 until the tooth 48 closest to the flange 46 abuts the outer surface 56 to lock the fastener 16 to the mat 52. This step is repeated until all of the fasteners 16 are installed in their corresponding aperture in the mat 52. This step can be performed at a location remote from the vehicle assembly site, such as at the mat molding facility. The mat 52 is then fixed in position adjacent to the firewall 24 using conventional fastening techniques. The mat 54 is subsequently positioned in place adjacent to the firewall such that the channel 82 is in mutual alignment with and engages the channel 64 in the mat 52. The pin 44 of each fastener 16 is simultaneously aligned with the aperture 94 of the mat 54. The mutual engagement of the channels 64 and 82 greatly facilitate the alignment and installation of the mats 52 and 54 with respect to each other. The mat 54 is then pushed inwardly until the pin of each fastener extends through its respective aperture 94 in the mat 54 to secure the mats together.

In the installed position, the inner surfaces 58, 80 of the mats 52, 54, respectively, face the vehicle firewall 24, while the outer surfaces 56, 78 face the underside of a vehicle carpet (not shown) and extend past the carpet behind the instrument panel. As in the previous embodiment, an inner space 96 formed by the spacer ribs 66, 68 can be filled with a well known inner absorber mat. It is to be understood that other spacer ribs (not shown) can be positioned at different locations on each mat in order to preserve the integrity of the inner space 96. A portion of the inner surface 80 of the mat 54 is in contact with a portion of the outer surface 56 of the mat 52 at two separate locations, as denoted by numerals 98, 100. These contact portions serve to acoustically seal the mats 52, 54 at the joint between the two. In this embodiment, the orientation of the fastener 16 gives the assembler a clear view of the fastener 16 in the assembly process.

A third embodiment of a multi-part dash mat assembly 102 is illustrated in FIGS. 6 and 7, wherein like parts in the previous embodiments are represented by like numerals. The multi-part dash mat assembly 102 includes a first dash mat portion 104 and a second dash mat portion 106 that is adapted for sealingly mounting to the first dash mat portion 104 in the steering column area of a vehicle. As in the previous embodiments, the first and second dash mat portions 104 and 106 are preferably formed of a filled, elastomeric, moldable polymer such as elastomeric polypropylene, and serve as sound barrier layers to reduce the transmission of sound from the engine compartment through the fire wall 24 and into the passenger compartment of a vehicle.

The first dash mat portion 104 includes an opening 108 that corresponds with an opening 110 in the fire wall. Both openings 108 and 110 form a passageway large enough for the subsequent installation of a steering column assembly (not shown). The second dash mat portion 106 includes an opening 112 for receiving the steering column assembly and multiple mounting apertures 114 for installing the second dash mat portion 106 onto the fire wall 24. An integrally molded boot 116 can also be provided on the second dash mat portion 106 with an aperture 117 for the passage of wires, sleeves, etc., therethrough.

The second dash mat portion 106 is in the form of a modular plate and is shaped slightly larger than the openings 108 and 110 to overlap the first dash mat portion 104.

With particular reference to FIG. 7, the second dash mat portion 106 includes an outer surface 118, an inner surface 120, and a tapered terminal edge 122. An elongate spacer rib 124 with an inner facing edge 134 is integrally formed with and extends from the inner surface 120 of the second dash mat portion 106. The elongate rib 124 preferably extends parallel to and in proximity with the terminal edge 122. A section 138 of the second dash mat portion 106 between the terminal edge 122 and the spacer rib 124 is curved slightly downward.

Similarly, the first dash mat portion 104 includes an inner surface 126, an outer surface 128, and a tapered terminal edge 130. An elongate spacer rib 132 with an outer facing edge 136 is integrally formed with and extends from the outer surface 128 of the first dash mat portion 104. The elongate rib 132 preferably extends parallel to and in proximity with the terminal edge 130. A section 140 of the first dash mat portion 104 between the terminal edge 130 and the spacer rib 132 is curved slightly upward.

In the installed position, the terminal edge 122 of the second dash mat portion 106 and the inner edge 134 of the spacer rib 124 is in contact with the inner outer surface 128 of the first dash mat portion 104. Likewise, the terminal edge 130 of the first dash mat portion 104 and the outer edge 136 of the spacer rib 132 is in contact with the inner surface 120 of the second dash mat portion 106. An interior insulating or dead air space 142 is formed between the two dash mat portions 106 and 104. An integral seal between the first and second dash mat portions is formed by friction at the contacting surfaces and an air pressure differential produced by the displacement of air from the inner space 142 when the second dash mat portion 106 is pressed against the first dash mat portion 106 during installation. The inner surface 126 of the first dash mat portion 104 faces the fire wall 24, and a foam absorber layer 142 may be disposed therebetween. Furthermore, additional spacer ribs (not shown) may be integrally formed with and extend from the inner surface 126 of the first dash mat portion 104 to abut the fire wall 24. Also, fasteners as described in the previous embodiments may be incorporated into the present embodiment to secure the first and second dash mat portions to each other. Preferably, the fasteners would be positioned between the spacer ribs 132 and 124.

Although the invention finds particular use in automobile dash mats, it is to be understood that the invention also finds use in other automotive or non-automotive applications wherein two adjacent panels or layers of material are to be attached temporarily or permanently to a support surface.

Reasonable variation and modification are possible within the spirit of the foregoing specification and drawings without departing from the scope of the invention.

The embodiments for which an exclusive property or privilege is claimed are defined as follows:

1. An acoustical barrier adapted to be mounted to a barrier wall, the acoustical barrier comprising:

first and second mat portions juxtaposed to each other in overlapping relationship, each mat portion being of a molded construction and having sound dampening characteristics with an inner surface adapted to face the barrier wall and an outer surface adapted to face away from the barrier wall;

the first and second mat portions each having a terminal edge; the terminal edge of the second mat portion being in engagement with one of the inner and outer surfaces of the first mat portion to thereby acoustically seal the first and second mat portions together;

a first spacer rib having one end integrally molded as a single piece with one of the first and second mat portions, the rib extending from the one mat portion to the other mat portion or from the one mat portion to the barrier wall when the acoustical barrier is mounted thereto, the first spacer rib being adjacent to but spaced from the terminal edge of the one mat portion to space the one mat portion from the other mat portion or to space the one mat portion from the barrier wall; and a second spacer rib having one end integrally molded as a single piece with the other of the first and second mat portions, the second spacer rib extending from the other of the first and second mat portions to the one mat portion.

2. An acoustical barrier according to claim 1 wherein the first spacer rib generally follows the profile of the terminal edge of the one mat portion.

3. An acoustical barrier according to claim 2 wherein the terminal edge of the first mat portion is in engagement with the inner surface of the second mat portion and the first and second spacer ribs are positioned between the first and second terminal edges to thereby create an enclosed insulating space between the terminal edges of the mat portions.

4. An acoustical barrier according to claim 2 wherein the second mat portion includes an aperture extending between the inner and outer surfaces thereof, and further comprising a hollow spacer rib surrounding the aperture, the hollow spacer rib having one end integrally molded as a single piece with the second mat portion, the hollow spacer rib being adjacent the terminal edge of the second mat portion, a free end of the spacer rib having an inner edge that faces the barrier wall when the acoustical barrier is mounted thereto.

5. An acoustical barrier according to claim 4 wherein the hollow spacer rib is positioned between the first and second terminal edges of the first and second mat portions, respectively.

6. An acoustical barrier according to claim 5 wherein the first mat portion includes an aperture in alignment with the aperture in the second mat portion; and further comprising a fastener extending through the apertures for securing the first and second mat portions together.

7. An acoustical barrier according to claim 6 and further comprising a conical depression formed in the second mat portion between the aperture and the hollow rib of the second mat portion.

8. An acoustical barrier adapted to be mounted to a barrier wall, the acoustical barrier comprising:
   first and second mat portions mounted to each other in overlapping relationship, each mat portion being of a molded construction and having sound dampening characteristics with an inner surface adapted to face the barrier wall and an outer surface adapted to face away from the barrier wall;
   the first and second mat portions each having a terminal edge and an integrally molded channel extending adjacent the terminal edge; the channel of the second mat portion being received within the channel of the first mat portion to thereby mutually align the first and second mat portions when mounting the mat portions together;
   a hollow boss is formed at the bottom of the channel at the first mat portion, the hollow boss including an aperture extending therethrough between the inner and outer surfaces of the first mat portion; and
   a fastener having a stud and a head formed at one end thereof; the head being positioned within the hollow boss and in contact with the inner surface of the first mat portion, the stud extending through the aperture and into the channel of the first mat portion.

9. An acoustical barrier according to claim 8 wherein the outer surface of the first mat portion engages the inner surface of the second mat portion adjacent the channels.

10. An acoustical barrier according to claim 8 wherein the fastener further comprises a plurality of frusto-conically shaped retention barbs extending along a length of the stud, and wherein one of the retention barbs contacts the outer surface of the first mat portion to thereby retain the fastener thereon.

11. An acoustical barrier according to claim 10 wherein a bottom of the channel of the second mat portion includes an aperture that receives the fastener stud, and further wherein another of the retention barbs contacts the outer surface of the second mat portion to thereby secure the first and second mat portions together.

12. An acoustical barrier adapted to be mounted to a barrier wall, the acoustical barrier comprising:
   first and second mat portions juxtaposed to each other in overlapping relationship, each mat portion being of a molded construction and having sound dampening characteristics with an inner surface adapted to face the barrier wall and an outer surface adapted to face away from the barrier wall;
   the first and second mat portions each having a terminal edge; the terminal edge of the second mat portion being in engagement with one of the inner and outer surfaces of the first mat portion to thereby acoustically seal the first and second mat portions together;
   a first spacer rib having one end integrally molded as a single piece with one of the first and second mat portions, the rib extending from the one mat portion to the other mat portion or from the one mat portion to the barrier wall when the acoustical barrier is mounted thereto, the first spacer rib being adjacent to but spaced from the terminal edge of the one mat portion to space the one mat portion from the other mat portion or to space the one mat portion from the barrier wall;
   an acoustical barrier wherein the second mat portion comprises an opening and the terminal edge of the second mat portion extends around the periphery of the opening, and further wherein the terminal edge of the first mat portion extends around an outer periphery thereof; and
   wherein the second mat portion comprises an opening and the terminal edge of the second mat portion extends around the periphery of the opening, and further wherein the terminal edge of the first mat portion extends around an outer periphery thereof.

13. An acoustical barrier adapted to be mounted to a barrier wall, the acoustical barrier comprising:
   first and second mat portions mounted to each other in overlapping relationship, each mat portion being of a molded construction and having sound dampening characteristics with an inner surface adapted to face the barrier wall and an outer surface adapted to face away from the barrier wall;
   the first and second mat portions each having a terminal edge and an integrally molded channel extending adjacent the terminal edge; the channel of the second mat portion being received within the channel of the first mat portion to thereby mutually align the first and second mat portions when mounting the mat portions together;
   the first mat portion comprises an opening and the terminal edge of the first mat portion extends around the periphery of the opening, and the terminal edge of the second mat portion extends around an outer periphery of the second mat portion; and
   the first mat portion comprises an opening and the terminal edge of the first mat portion extends around the periphery of the opening, and further wherein the terminal edge of the second mat portion extends around an outer periphery of the second mat portion.

* * * * *